(12) United States Patent
Ishii et al.

(10) Patent No.: US 9,050,739 B2
(45) Date of Patent: Jun. 9, 2015

(54) METHOD OF RECYCLING A GOLF BALL

(75) Inventors: Hideyuki Ishii, Portland, OR (US);
Aaron Bender, Portland, OR (US);
Yasushi Ichikawa, Tualatin, OR (US);
Bradley C. Tutmark, Aloha, OR (US);
Nicholas Yontz, Portland, OR (US);
Hsin Cheng, Yun-lin Hsien (TW)

(73) Assignee: NIKE, Inc., Beaverton, OR (US)

( * ) Notice: Subject to any disclaimer, the term of this patent is extended or adjusted under 35 U.S.C. 154(b) by 180 days.

(21) Appl. No.: 13/485,602

(22) Filed: May 31, 2012

(65) Prior Publication Data

US 2013/0320576 A1 Dec. 5, 2013

(51) Int. Cl.
*B29C 73/00* (2006.01)
*B29B 17/02* (2006.01)
*B29L 31/54* (2006.01)

(52) U.S. Cl.
CPC ........... *B29B 17/02* (2013.01); *B29L 2031/546* (2013.01); *B29B 2017/0203* (2013.01); *B29B 2017/0255* (2013.01)

(58) Field of Classification Search
USPC ..................................................... 264/36.12
See application file for complete search history.

(56) References Cited

U.S. PATENT DOCUMENTS

| 4,892,647 | A | * | 1/1990 | Liddle et al. .................... 209/11 |
| 5,569,418 | A | | 10/1996 | Russo, Sr. |
| 2005/0148408 | A1 | * | 7/2005 | Shannon et al. .............. 473/378 |
| 2009/0280928 | A1 | | 11/2009 | Comeau et al. |

FOREIGN PATENT DOCUMENTS

| JP | 2004-211928 A | 7/2004 |
| JP | 2007-239034 A | 9/2007 |
| KR | 10-1999-0009572 A | 2/1999 |
| KR | 10-2001-0026768 A | 4/2001 |

OTHER PUBLICATIONS

International Search Report and Written Opinion for PCT/US2013/043495, dated Aug. 27, 2013.

* cited by examiner

*Primary Examiner* — Joseph S Del Sole
*Assistant Examiner* — John Robitaille
(74) *Attorney, Agent, or Firm* — Honigman Miller Schwartz and Cohn LLP; Anna M. Budde; Jonathan P. O'Brien

(57) ABSTRACT

A method of making and recycling a golf ball is disclosed. The method may include processing a used golf ball to make the materials of the used golf ball reusable in a new golf ball. As a result, the disclosed method may decrease the waste of disposing of used golf balls and the costs associated with acquiring and/or processing new materials. The method may include melting a golf ball made of layers each having a different melting point. The materials may be separated by melting the different layers one by one. The method of recycling a golf ball may generally include pulverizing used golf balls made of materials having differing amounts of magnetic additive into particles. The particles may be separated by a magnetic field. At least a portion of the particles may be reused to make a new golf ball.

7 Claims, 9 Drawing Sheets

METHOD OF RECYCLING A GOLF BALL

BACKGROUND

The present invention relates generally to a golf ball made of recyclable materials.

The game of golf is an increasingly popular sport at both amateur and professional levels. A wide range of technologies related to the manufacture and design of golf balls are known in the art. Such technologies have resulted in golf balls with a variety of play characteristics. For example, some golf balls have a better flight performance than other golf balls. Some golf balls have a good feel when hit with a golf club. While materials have advanced to increase the performance of golf balls, the materials are not always easy to recycle. Thus, to help manage costs and reduce damage to the environment, it would be advantageous to make a golf ball made of recyclable materials.

SUMMARY

Generally, the present disclosure presents a method of making and recycling a golf ball. The method may include processing a used golf ball to make the materials of the used golf ball reusable in a new golf ball. As a result, the disclosed method may decrease the waste of disposing of used golf balls and the costs associated with acquiring and/or processing new materials. The method of recycling a golf ball may generally include pulverizing a used golf ball into particles. The used golf ball may be made of materials having different melting points. The particles may be heated to a temperature that is the same or higher than the lowest melting point of the materials. In this manner, different types of materials may be separated from each other. Then, at least a portion of the particles may be reused in a new golf ball. The particles may be melted and injected into a sandwich mold to create a new golf ball.

In one aspect, the disclosure provides a method of recycling a golf ball. The method may include providing a golf ball made of multiple materials each having a different melting point. A first solid material of the golf ball may have the lowest melting point and a second solid material of the golf ball may have the second lowest melting point. The method may include heating the golf ball to a first temperature that is the same or higher than the melting point of the first material and lower than the melting points of a first set of remaining solid materials, thereby melting the first solid material into a first molten material without melting the first set of remaining solid materials. The method may include separating the first molten material from the remaining solid materials of the golf ball. The method may include pulverizing the golf ball into particles. The step of separating the first molten material from a first set of remaining solid materials of the golf ball may include straining particles of remaining solid material. The method may include delivering the particles of pulverized golf ball material into a tube. The method may include twisting a twin screw within the tube to dry the particles and to move the particles out of the tube. The golf ball may include a third material including magnetic additive and the method may include flowing particles of the second material and the third material over a first compartment that is magnetized and a second compartment that is not magnetized, thereby drawing the particles of the third material into the first compartment and drawing the particles of the second material into the second compartment.

The method may include heating the golf ball to a second temperature that is the same or higher than the melting point of the second material and lower than the melting points of a second set of solid materials, thereby melting the second solid material into a second molten material without melting the second set of solid materials. The method may include separating the second molten material from the second set of remaining solid materials of the golf ball. The first material may be a cover layer of the golf ball. The step of separating the first molten material from the first set of remaining solid materials of the golf ball may include scraping the first molten material from the first set of remaining solid materials. The method may include heating the golf ball to a second temperature that is the same or higher than the melting point of the second material and lower than the melting points of the other materials, thereby melting the second solid material into a second molten material. The method may include separating the second molten material from a second set of remaining solid materials of the golf ball.

In one aspect, the disclosure provides a method of recycling a golf ball. The method may include providing a golf ball made of multiple materials each having a different melting point. A first solid material of the golf ball may have the lowest melting point and a second solid material of the golf ball may have the second lowest melting point. The method may include heating the golf ball to a first temperature that is the same or higher than the melting point of the second material and lower than the melting points of the other materials, thereby melting the first solid material into a first molten material and the second solid material into a second molten material. The method may include separating the first molten material and the second molten material from the remaining solid materials of the golf ball. The method may include pulverizing the golf ball into particles. The step of separating the first molten material from a first set of remaining solid materials of the golf ball may include straining particles of solid material.

In one aspect, the disclosure provides a method of recycling a golf ball. The method may include pulverizing a golf ball made of a first material containing a magnetic additive and a second material not containing a magnetic additive. The method may include flowing the particles of the pulverized golf ball over a first compartment that is magnetized and a second compartment that is not magnetized, thereby drawing the particles of the first material into the first compartment and drawing the particles of the second material into the second compartment. The method may include using the first material and the second material to make a new golf ball.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Generally, the present disclosure relates to a method of recycling a golf ball. In this disclosure, the terms "used golf ball" and "new golf ball" are used to distinguish between a golf ball that is to be recycled and a golf ball that is made from recycled materials. Accordingly, "used golf ball" means a golf ball that is to be recycled. The term "used golf ball" can include golf balls that have literally been used in a golf game and golf balls that have not literally been used. "New golf ball" refers to a golf ball made from materials recycled from the "used golf ball."

Figure 1:
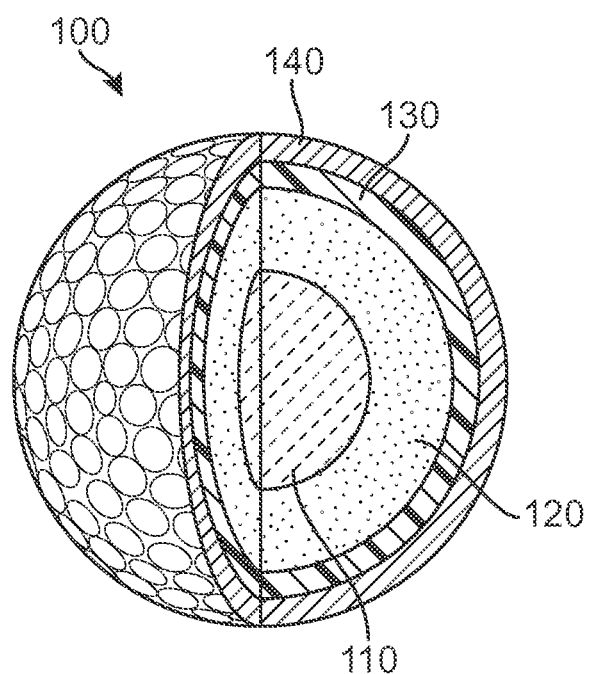
FIG. 1 is a golf ball according to an exemplary embodiment.

FIG. 1 shows an exemplary embodiment of a golf ball 100. Golf ball 100 may include an inner core layer 110, an outer core layer 120, a mantle (inner cover) layer 130, and an outer cover layer 140. While the exemplary embodiment of golf ball 100 has been described and illustrated as having four layers, other embodiments may include any number of layers. For example, in some embodiments, golf ball 100 may be a one-piece, two-piece, three-piece, or five-piece ball. In some embodiments, golf ball 100 may include more than five layers. The number of layers may be selected based on a variety of factors. For example, the number of layers may be selected based on the type of materials used to make the golf ball and/or the size of the golf ball.

The type of materials used to make the layers of the golf ball may be selected based on a variety of factors. For example, the type of materials used to make the layers of the golf ball may be selected based on the properties of the material and/or the processes used to form the layers. Exemplary materials are discussed below with respect to the individual layers of the exemplary embodiment. In some embodiments, one or more layers may be made from different materials. In some embodiments, one or more layers may be made from the same materials.

In some embodiments, the materials used to make the layers of the golf ball may be selected to aid in recycling the golf ball. In such embodiments, the materials may be selected to aid in separating and identifying the materials before reusing the materials. This way the materials may be stored separately before using and/or the proper proportions of the materials may be measured out for reusing. For example, in an embodiment in which a used golf ball is made of material A and material B, the used golf ball may be pulverized into particles so that the materials may be reused to make new golf balls. Pulverizing the used golf ball may result in particles of material A and material B to become intermixed. If only material A, and not material B, is to be used in a layer of a new golf ball, it may be helpful to be able to separate material A from material B. Similarly, if material A and material B are to be used in a certain proportion in a layer of a new golf ball, it may be helpful to be able to distinguish between material A and material B. Separating and identifying materials may be helpful in recycling golf balls made of any number of materials and during any type of recycling process. For example, separating and identifying materials may be helpful in recycling golf balls made of four different types of materials.

In some embodiments, the melting point of the materials used to make golf ball 100 may be used to separate the materials during recycling. This way, the materials of golf ball 100 may be melted one at a time. In such an embodiment, golf ball 100 may be made from materials having different melting points such that, as the temperature of golf ball 100 is raised, more materials may begin to melt. In this manner, the layers may be melted one by one and molten material may be separated from solid material. The materials may be selected based on the melting temperatures of the materials. The melting temperatures may be used to control which material melts at each interval of heating. The materials used to make the golf ball may include any suitable material generally known to be used in golf balls. In some embodiments, the materials may include thermoplastics. For example, the materials may include high melt thermoplastics, such as polyetheramides and/or polyetheresters. In some embodiments, the materials may include PEBAX (a polyetheramide produced by Elf-Atochem), HYTREL (a polyetherester produced by DuPont), ESTANE (a thermoplastic urethane either ether or ester urethane produced by Lubrizol, Inc.), or any other material disclosed in Comeau et al., U.S. patent publication number 2009/0280928, entitled Golf Ball with Heat Resistant Layer, published on Nov. 12, 2009, the entirety of which is hereby incorporated by reference. In some embodiments, the materials may include resins, such as SURLYN, produced by E. I. DuPont de Nemours and Company. In some embodiments, the materials may include a highly neutralized acid polymer, such as HPF 1000 or AD 1035, both produced by E. I. DuPont de Nemours and Company.

In some embodiments, the different materials used to make the golf ball may each have a melting temperature that is at least 10 degrees Celsius different from the melting temperatures of the other materials. For example, in some embodiments, a first material of the golf ball may include HPF 2000, produced by E. I. DuPont de Nemours and Company. HPF 2000 has a melting temperature of about 73 degrees Celsius. A second material of the golf ball may include SURLYN 8528, produced by E. I. DuPont de Nemours and Company. SURLYN 8528 has a melting temperature of about 93 degrees Celsius. In such embodiments, when the temperature of the golf ball is raised to 75 degrees Celsius, the first material may melt and the second material may remain solid.

In some embodiments, golf ball 100 may be pulverized into particles before melting the materials. In such an embodiment, the materials may be selected based on the melting temperature of the materials. For example, outer cover layer 140 may have the highest melting temperature. Mantle layer 130 may have the lowest melting temperature. Outer core layer 120 may have the second highest melting temperature. Inner core layer 110 may have the second lowest melting temperature. As discussed above, the melting points of the materials may be sufficiently disparate for the melting of the materials to occur at different temperatures. This way, the particles of golf ball 100 may be heated to the certain temperatures to control which materials melt. For example, the particles may be heated to a temperature that is the same or higher than the lowest melting point of the materials and lower than the second lowest melting point of the materials. This heating may cause the particles of the materials having the lowest melting point to melt without causing the particles of the other materials to melt.

Figure 2:
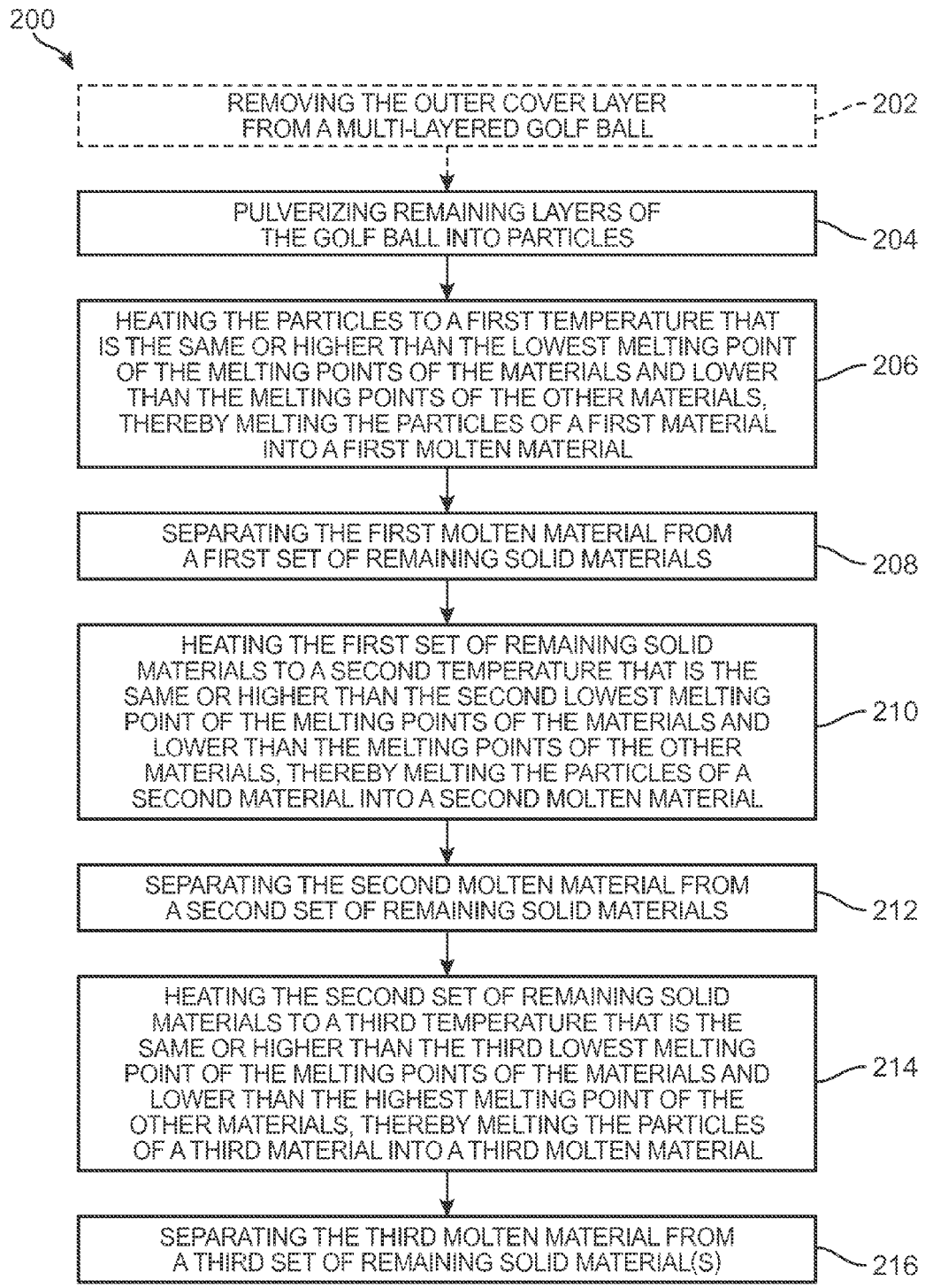
FIG. 2 is a flow chart showing a method of recycling a golf ball according to an exemplary embodiment.

FIG. 2 is a flowchart showing an exemplary method 200 of recycling a golf ball. Method 200 may include an optional step 202 of removing the outer cover layer from a multi-layered golf ball 202. For example, outer cover layer 140 may be ground off or removed by some other suitable process. Method 200 may include a step 204 of pulverizing remaining layers of the golf ball into particles. Step 204 may be performed by any type of equipment known to those skilled in the art. For example, a Cumberland A Series 1000X granulator may be used to pulverize a golf ball into particles, granules, and/or pellets. The type of equipment used to pulverize the golf ball may be selected based on a variety of factors. For example, the type of equipment may be selected based on the material of the layers of the golf ball.

Method 200 may include a step 206 of heating the particles to a first temperature that is the same or higher than the lowest melting point of the melting points of the materials and lower than the melting points of the other materials, thereby melting the particles of a first material into a first molten material. For example, if outer cover layer 140 has not been removed before step 204 is performed and outer cover layer 140 has the second lowest melting temperature, particles of golf ball 100 may be heated to a first temperature that is the same or higher than the melting point of outer cover layer 140. The first temperature may be lower than the melting points of the other materials so as not to melt the other materials. For example, the first temperature may be lower than the melting points of mantle layer 130, outer core layer 120, and inner core layer 110.

Method 200 may include a step 208 of separating the first molten material from a first set of remaining solid materials. For example, step 212 may include separating the first molten material from solid particles of mantle layer 130, outer core layer 120, and inner core layer 110. In some embodiments, the melted material may be strained out from the solid particles. In some embodiments, the solid materials may be skimmed away from the melted material by a perforated instrument, such as a slotted spoon.

Method 200 may include a step 210 of heating the first set of remaining solid materials to a second temperature that is the same or higher than the second lowest melting point of the melting points of the materials and lower than the melting points of the other materials, thereby melting the particles of a second material into a second molten material. For example, if mantle layer 130 has the second lowest melting temperature, particles of golf ball 100 may be heated to a second temperature that is the same or higher than the melting point of mantle layer 130. The second temperature may be lower than the melting points of the other materials so as not to melt the other materials. For example, if the other materials are particles of outer core layer 120 and inner core layer 110, the third temperature may be lower than the melting points of outer core layer 120 and inner core layer 110.

Method 200 may include a step 212 of separating the second molten material from a second set of remaining solid materials. For example, step 212 may include separating the second molten material from particles of outer core layer 120 and inner core layer 110. Step 212 may be performed in the same manner described above with reference to step 208.

Method 200 may include a step 214 of heating the second set of remaining solid materials to a third temperature that is the same or higher than the third lowest melting point of the melting points of the materials and lower than the highest melting point of the other materials, thereby melting the particles of a third material into a third molten material. For example, if outer core layer 120 has the third lowest melting temperature, particles of golf ball 100 may be heated to a third temperature that is the same or higher than the melting point of outer core layer 120. The third temperature may be lower than the melting points of the other materials so as not to melt the other materials. For example, if the other material is particles of inner core layer 110, the third temperature may be lower than the melting point of inner core layer 110.

Method 200 may include a step 216 of separating the third molten material from a third set of remaining solid material(s). For example, if particles of inner core layer 110 are the last remaining solid material, step 216 may include separating the third molten material from the particles of inner core layer 110. Step 216 may be performed in the same manner described above with reference to step 208.

In some embodiments, performing steps 202, 204, 206, 208, 210, 212, 214, and 216 may result in one or more remaining materials. For example, if step 202 is not performed and inner core layer 110 has the highest melting point, particles of inner core layer 110 may be the remaining material. The remaining material(s) may be prepared recycling. For example, in some embodiments, the remaining material(s) may be melted.

In some embodiments, less than all of the materials may be melted. For example, only one or two materials may be melted and strained from the solid particles. Then, the solid particles may be separated in another way and/or prepared for another type of processing. For example, the solid particles leftover after melting may be separated by magnets in the manner described below with reference to FIGS. 8 and 9. Any of the techniques used to separate materials may be combined with each other. In some embodiments, the materials of the particles not intended to be melted may include materials simply having melting points that are higher than the melting points of the materials intended to be melted. In other embodiments, the materials of the particles not intended to be melted may be materials not conducive to melting, such as thermosets. In some embodiments, the materials intended to be melted may include thermoplastics.

In some embodiments, the materials used to make the layers of golf ball 100 may be selected such that the melting points of the layers correspond with the order in which the layers are to be melted. For example, in some embodiments, the melting points of the layers may become progressively higher from outer cover layer 140 to inner core layer 110. This way, golf ball 100 may be melted without being pulverized first. Outer cover layer 140 may have the lowest melting temperature. Mantle layer 130 may have the second lowest melting temperature. Outer core layer 120 may have the second highest melting temperature. Inner core layer 110 may have the highest melting temperature. As discussed with reference to FIG. 3 below, this embodiment of golf ball 100 may be recycled by melting each layer from the outside in.

Figure 3:
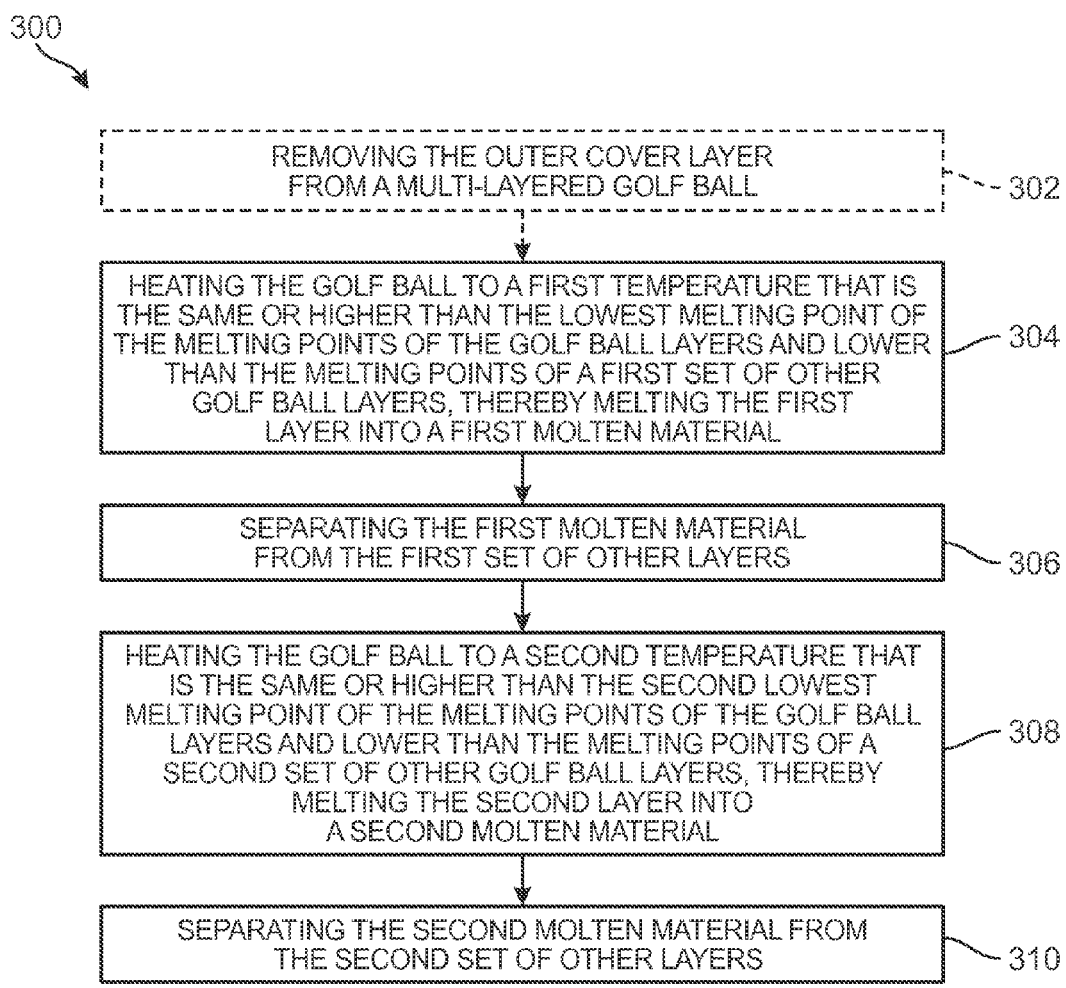
FIG. 3 is a flow chart showing a method of recycling a golf ball according to an exemplary embodiment.

FIG. 3 is a flowchart showing an exemplary method 300 of recycling a golf ball. Method 300 may include an optional step 302 of removing the outer cover layer from a multi-layered golf ball. For example, outer cover layer 140 may be ground off or removed by some other suitable process. Method 300 may include a step 304 of heating the golf ball to a first temperature that is the same or higher than the lowest melting point of the melting points of the golf ball layers and lower than the melting points of a first set of other golf ball layers, thereby melting the first layer into a first molten material. For example, if outer cover layer 140 has been removed and mantle layer 130 has the lowest melting temperature, golf ball 100 may be heated to a first temperature that is the same or higher than the melting point of mantle layer 130. The first temperature may be lower than the melting points of the other layers so as not to melt the other layers.

In some embodiments, mantle layer 130 may fully melt during step 304. In some embodiments, mantle layer 130 may not fully melt during step 304. For example, mantle layer 130 may simply soften enough to be removed from outer core layer 120.

Method 300 may include a step 306 of separating the first molten material from the first set of other layers. In some embodiments, step 306 may include holding golf ball 100 over a first vessel as mantle layer 130 melts during step 304 to collect melted material. In some embodiments, golf ball 100 may rest on a perforated surface, such as a screen, over the first vessel during step 306. In some embodiments, step 306 may include scraping mantle layer 130 away from outer core layer 120 into the first vessel as mantle layer 130 melts.

Method 300 may include a step 308 of heating the golf ball to a second temperature that is the same or higher than the second lowest melting point of the melting points of the golf ball layers and lower than the melting points of a second set of other golf ball layers, thereby melting the layer into a second molten material. For example, if outer core layer 120 has the second lowest melting temperature, golf ball 100 may be heated to a second temperature that is the same or higher than the melting point of outer core layer 120. The second temperature may be lower than the melting points of the other layers so as not to melt the other layers.

In some embodiments, outer core layer 120 may fully melt during step 308. In some embodiments, outer core layer 120 may not fully melt during step 308. For example, outer core layer 120 may simply soften enough to be removed from inner core layer 110.

Method 300 may include a step 310 of separating the second molten material from the second set of other layers. In some embodiments, step 310 may include holding golf ball 100 over a second vessel as mantle layer 130 melts during step 308 to collect melted material. In some embodiments, golf ball 100 may rest on a perforated surface, such as a screen, over the second vessel during step 308. In some embodiments, step 308 may include scraping outer core layer 120 away from inner core layer 110 into the second vessel as outer core layer 120 melts.

In some embodiments, performing steps 302, 304, 306, 308, and 310 may result in one or more remaining materials. For example, inner core layer 110 may be the remaining material. The remaining material(s) may be prepared other recycling processes. For example, in some embodiments, the remaining material(s) may be pulverized and/or melted.

In some embodiments, less than all of the layers may be melted. In such embodiments, the melting point of the layers not intended to be melted may be sufficiently high to prevent such layers from melting during processing. For example, inner core layer 110 may have a melting point that is higher than all of the other layers. After all of the other layers are melted and removed from inner core layer 110, inner core layer 110 may be left whole or may be prepared for another type of processing. For example, inner core layer 110 may be pulverized to prepare the material of inner core layer 110 to be mixed with particles of other materials. In some embodiments, the layers not intended to be melted may be made of a thermoset or other type of material that may not be conducive to melting. Accordingly, the materials of these layers may be separated from each other by another manner. For example, these layers may be ground away from the other layers. In another example, these layers may be pulverized and separated in the manner discussed below. In another example, outer cover layer 140 may be the only layer removed through melting. In such an example, the materials of the other layers may have a higher melting point than that of outer cover layer 110 such that the other layers do not melt when outer cover layer 110 is melted. However, the melting points of the other layers may be the same or different from each other since the other layers may not be melted.

Figure 4:
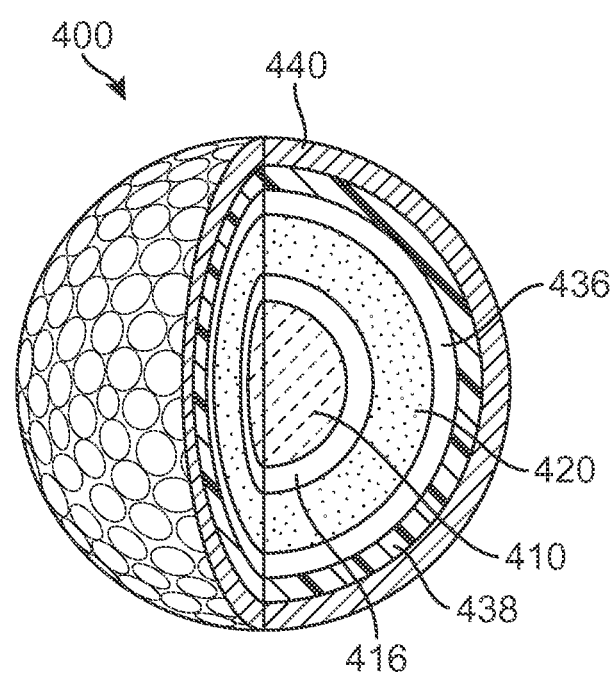
FIG. 4 is a golf ball according to an exemplary embodiment.

FIG. 4 shows an exemplary embodiment of a golf ball 400. Golf ball 400 may include an inner core layer 410, an outer core layer 420, a mantle layer 438, and an outer cover layer 440. While the exemplary embodiment of golf ball 400 has been described and illustrated as having three layers, other embodiments may include any number of layers. For example, in some embodiments, golf ball 400 may be a one-piece, two-piece, four-piece, or five-piece ball. In some embodiments, golf ball 400 may include more than five layers. The number of layers may be selected based on a variety of factors. For example, the number of layers may be selected based on the type of materials used to make the golf ball and/or the size of the golf ball.

Golf ball 400 may include an intermediate layer 416 between inner core layer 410 and outer core layer 420. Similarly, golf ball 400 may include an intermediate layer 436 between outer core layer 420 and mantle layer 438. In some embodiments, intermediate layer 416 and intermediate layer 436 may be made of the same types of materials. In some embodiments, intermediate layer 416 and intermediate layer 436 may be made of different types of materials. In some embodiments, intermediate layer 416 and/or intermediate layer 436 may act as primers and/or adhesives. For example, in some embodiments, intermediate layer 416 and/or intermediate layer 436 may include epoxy adhesives, acrylic adhesives, urethane adhesives, ethylene vinyl acetate adhesives, and/or rubber adhesives. Intermediate layer 416 and/or intermediate layer 436 may be made of materials that aid in separation between inner core layer 410, outer core layer 420, and mantle layer 438. For example, in some embodiments, intermediate layer 416 and/or intermediate layer 436 may be made of materials having lower melting points than the other layers. Such materials may be softened and/or melted to help separate inner core layer 410, outer core layer 420, and cover layer 440 from each other.

In some embodiments, inner core layer 410 may have a diameter ranging from about 19 mm to about 32 mm. In some embodiments, inner core layer 410 may have a diameter ranging from about 20 mm to about 30 mm. In some embodiments, inner core layer 410 may have a diameter ranging from about 21 mm to about 28 mm. In some embodiments, outer core layer 420 may have a thickness ranging from about 5 mm to about 11 mm. For example, outer core layer 420 may have a thickness of about 7 mm. In some embodiments, outer core layer 420 may have a thickness ranging from about 8 mm to about 15 mm. For example, in some embodiments, outer core layer 420 may have a thickness of about 11 mm.

In some embodiments, outer cover layer 440 and/or mantle layer 438 of golf ball 400 may have a thickness ranging from about 0.5 mm to about 2 mm. For example, outer cover layer 440 and/or mantle layer 438 may have a thickness of about 1 mm. In some embodiments, outer cover layer 440 and/or mantle layer 438 may have a thickness ranging from about 1 mm to about 1.5 mm. For example, in some embodiments, outer cover layer 440 and/or mantle layer 438 may have a thickness of about 1.2 mm.

In some embodiments, intermediate layer 416 and/or intermediate layer 436 may be substantially thinner than the other layers of golf ball 400. For example, in some embodiments, intermediate layer 416 and/or intermediate layer 436 may be less than or equal to 1 mm. In some embodiments, intermediate layer 416 and/or intermediate layer 436 may range from about 1 µm to about 0.70 mm. In some embodiments, intermediate layer 416 and/or intermediate layer 436 may range from about 0.01 mm to about 0.4 mm.

In some embodiments, golf ball 400 may have an intermediate layer between each layer. For example, in some embodiments, golf ball 400 may include an intermediate layer between mantle layer 438 and outer cover layer 440. In some embodiments, golf ball 400 may have an intermediate layer between less than all of the layers. For example, golf ball 400 may include intermediate layer 416 and not intermediate layer 436. In another example, golf ball may include intermediate layer 436 and not intermediate layer 416. The number of intermediate layers may be selected based on a variety of factors. For example, the number of intermediate layers may be selected based on the process used to recycle golf ball 400.

Figure 5:
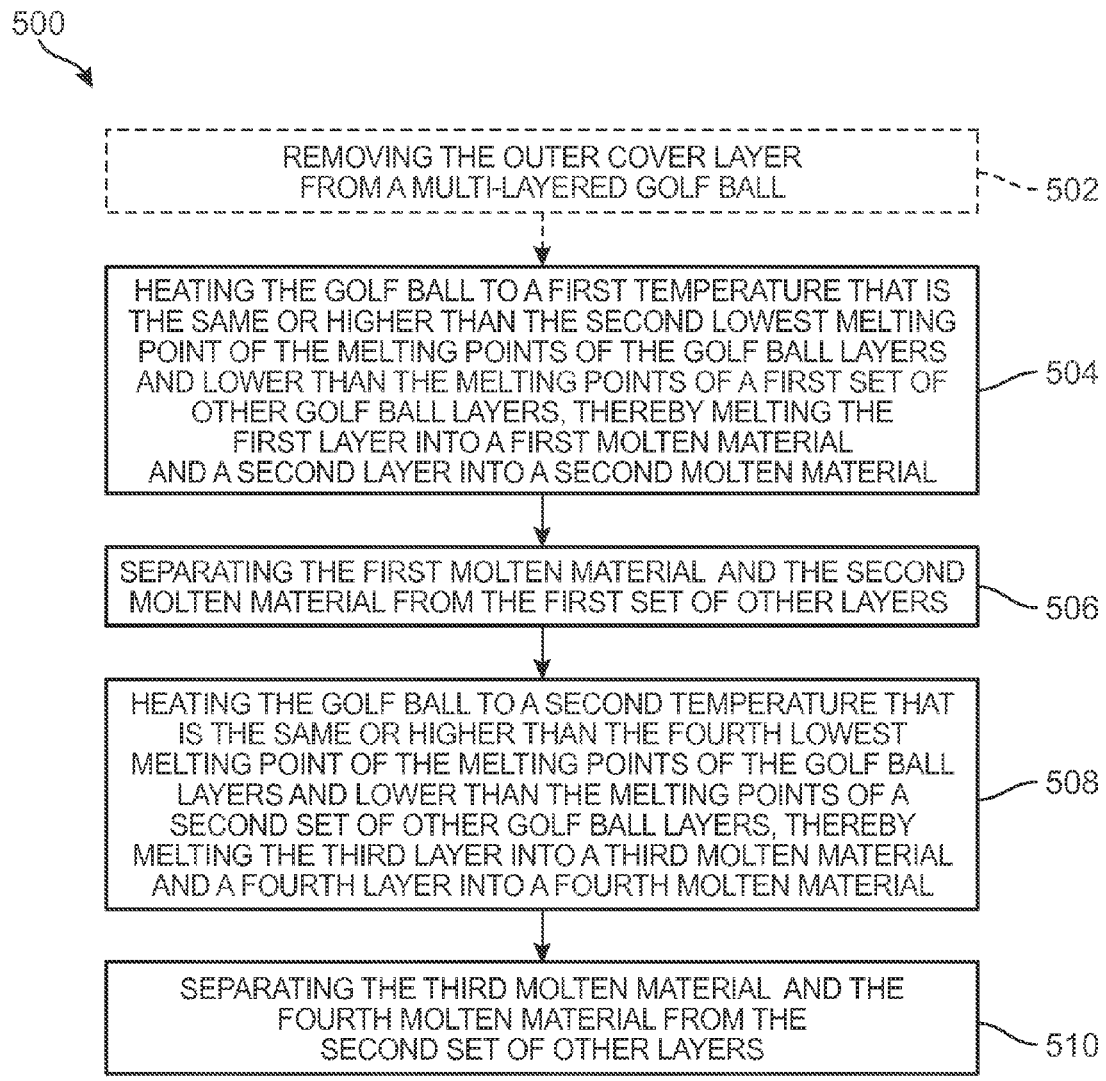
FIG. 5 is a flow chart showing a method of recycling a golf ball according to an exemplary embodiment.

In some embodiments, golf ball 400 may be recycled by any of the steps of method 200 and method 300. FIG. 5 is a flowchart showing an exemplary method 500 of recycling golf ball 400. Method 500 may include an optional step 502 of removing the outer cover layer from a multi-layered golf ball. For example, outer cover layer 440 may be ground off or removed by some other suitable process. Method 500 may include a step 504 of heating the golf ball to a first temperature that is the same or higher than the second lowest melting point of the melting points of the golf ball layers and lower than the melting points of a first set of other golf ball layers, thereby melting the first layer into a first molten material and a second layer into a second molten material. For example, if mantle layer 438 and intermediate layer 436 have the two lowest melting points, golf ball 400 may be heated to a first temperature that is the same or higher than the melting points of both mantle layer 438 and intermediate layer 436. The first temperature may be lower than the melting points of the other layers so as not to melt the other layers.

In some embodiments, mantle layer 438 and/or intermediate layer 436 may fully melt during step 504. In some embodiments, mantle layer 438 and/or intermediate layer 436 may not fully melt during step 504. For example, mantle layer 438 and/or intermediate layer 436 may simply soften enough to be removed from outer core layer 420.

Method 500 may include a step 506 of separating the first molten material and the second molten material from the first set of other layers. In some embodiments, step 506 may include holding golf ball 400 over a first vessel as the layers melt during step 504 to collect melted material. In some embodiments, golf ball 400 may rest on a perforated surface, such as a screen, over the second vessel during step 506. In some embodiments, step 506 may include scraping mantle layer 438 and/or intermediate layer 436 away from outer core layer 420 into the first vessel as mantle layer 438 and/or intermediate layer 436 melt.

Method 500 may include a step of 508 of heating the golf ball to a second temperature that is the same or higher than the fourth lowest melting point of the melting points of the golf ball layers and lower than the highest melting point of the golf ball layers, thereby melting the third layer into a third molten material and a fourth layer into a fourth molten material. For example, if outer core layer 420 and intermediate layer 416 have the third and fourth lowest melting points, golf ball 400 may be heated to a second temperature that is the same or higher than the melting points of both outer core layer 420 and intermediate layer 416. The second temperature may be lower than the melting points of the other layers so as not to melt the other layers.

In some embodiments, outer core layer 420 and intermediate layer 416 may fully melt during step 508. In some embodiments, outer core layer 420 and intermediate layer 416 may not fully melt during step 508. For example, outer core layer 420 and intermediate layer 416 may simply soften enough to be removed from inner core layer 410.

Method 500 may include a step 510 of separating the third molten material and the fourth molten material from the second set of other layers. In some embodiments, step 510 may include holding golf ball 400 over a second vessel as the layers melt during step 508 to collect melted material. In some embodiments, golf ball 400 may rest on a perforated surface, such as a screen, over the second vessel during step 510. In some embodiments, step 510 may include scraping outer core layer 420 and intermediate layer 416 away from inner core layer 410 into the second vessel as outer core layer 420 and intermediate layer 416 melt.

In some embodiments, intermediate layer 416 and/or intermediate layer 436 may be made of materials that are dissolvable in certain solvents. Accordingly, in such embodiments, golf ball 400 may be pulverized into particles. Then, to aid in separating the different materials, the particles may be placed in a solvent. The materials of intermediate layer 416 and intermediate layer 436 may be dissolved, releasing particles of mantle layer 438 from particles of outer core layer 420 and releasing particles of outer core layer 420 from particles of inner core layer 410. For example, in some embodiments, dissolvable materials may include thermoplastic polyurethane elastomers, thermoplastic polyamide elastomers, thermoplastic polyester elastomers, and ethylene propylene diene monomer (EPDM) rubbers. In some embodiments, solvents used to dissolve the dissolvable materials may include tetrahydrofuran, methyl isobutyl ketone, dimethylformamide, dimethyl sulfoxide, methylpyrrolidone, toluene, acetone, chloroform, and ethyl acetate.

Golf ball 100 and golf ball 400 may be made by any suitable process. For example, in some embodiments, injection molding and/or compression molding may be used to make any of the golf ball layers. The process of making the golf ball may be selected based on a variety of factors. For example, the process of making the golf ball may be selected based on the type of materials used and/or the number of layers included.

Figure 6:
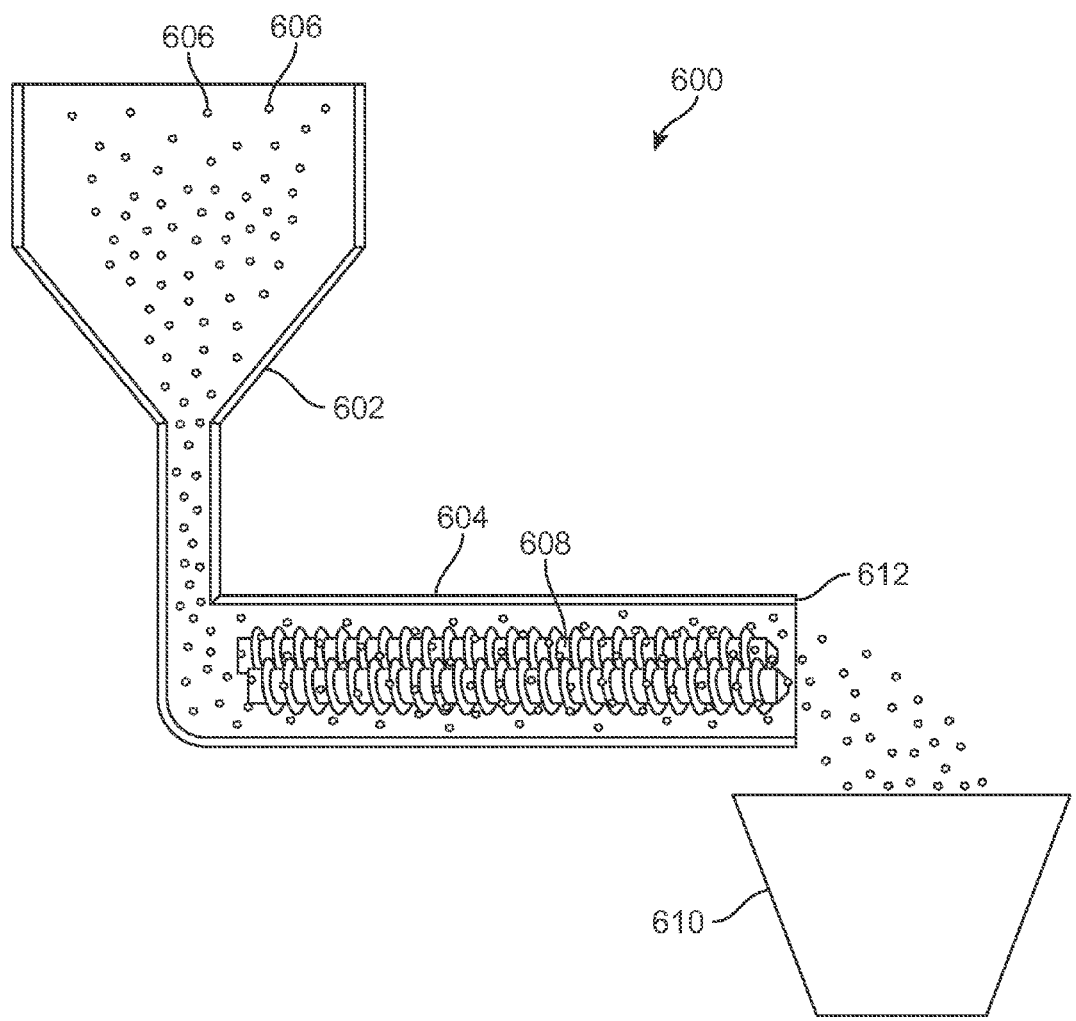
FIG. 6 is equipment that may be used to recycle a golf ball according to an exemplary embodiment.
Figure 7:
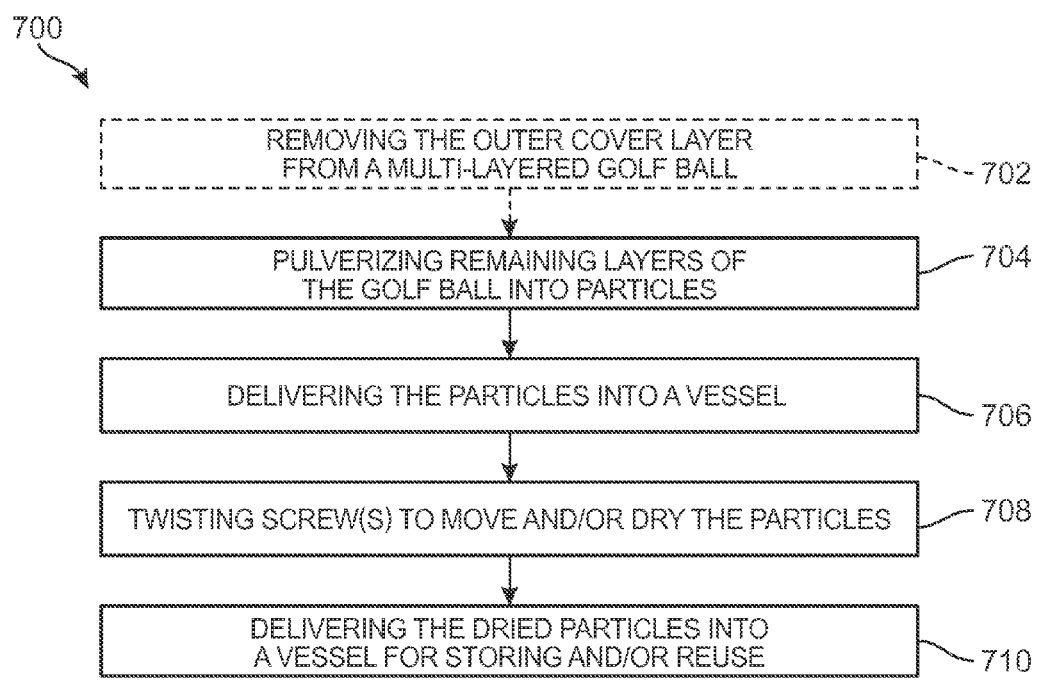
FIG. 7 is a flow chart showing a method of recycling a golf ball according to an exemplary embodiment.

FIG. 6 shows equipment 600 that may be used to perform an exemplary method 700 of recycling a golf ball. Details of method 700 are shown in FIG. 7. In some embodiments, equipment 600 may include a first vessel for collecting, storing, and/or dispensing particles of golf ball material. For example, the first vessel may include a first hopper 602. In some embodiments, first hopper 602 may be connected to a tube 604. In some embodiments, equipment 600 may include an agitation mechanism disposed within tube 604. For example, a set of twin screws 608 may be disposed within tube 604. The type of agitation mechanism may be selected based on a variety of factors. For example, the type of agitation mechanism may be selected based upon the type of material the golf balls to be recycled are made of. In some embodiments, equipment 600 may include a second vessel for collecting, storing, and/or dispensing particles of golf ball material. For example, as shown in FIG. 6, the second vessel may be a second hopper 610. Second hopper 610 may be disposed underneath an opening 612 of tube 604 to catch particles as the particles exit tube 604.

In some embodiments, method 700 may include an optional step 702 of removing the outer cover layer from a multi-layered golf ball. For example, outer cover layer 140 may be ground off or removed by some other suitable process. Method 700 may include a step 704 of pulverizing remaining layers of the golf ball into particles. Step 704 may be performed in the same manner discussed with reference to step 204 above.

Method 700 may dry pulverized particles of a golf ball for further processing. Method 700 may include a step 706 of delivering the particles into a vessel. For example, particles may be delivered into first hopper 602. In some embodiments, the particles may be processed in a bath of liquid to prepare the particles for further processes. In some embodiments, the particles may include a water absorbing material, such as resin. In such embodiments, the particles may absorb moisture from the air. Method 700 may include a step 708 of twisting twin screws 608 to move and/or dry the particles. As twin screws 608 twist, the particles may be moved through tube 604 by the motion of twin screws 608. The friction between the particles and twin screws 608 may generate heat that raises the temperature of the particles and causes moisture to evaporate. In embodiments in which other types of agitators are present in tube 604 in place of or in addition to twin screws 608, the other types of agitators may be operated during step 708. Method 700 may include delivering the dried particles into a vessel for storing and/or reuse.

Referring back to FIG. 1, in some embodiments, the materials used to make the layers of golf ball 100 may be selected based on the magnetic susceptibility of the materials. For example, in some embodiments, the material used to make a first layer of golf ball 100 may be magnetically susceptible and the material used to make a second layer be magnetically non-susceptible. Magnetic additives may be mixed with materials to make the materials magnetically susceptible. For example, the layers of golf ball 100 may be made of thermoplastics and/or thermosets containing a magnetic additive. The magnetic additive may include any suitable magnetic additive. For example, in some embodiments, the magnetic additive may include a ferrite magnetic powder, such as barium ferrite powder, strontium ferrite powder, and/or AlNiCo powder. In some embodiments, the magnetic additive may include iron oxides, such as hematite and magnetite. In some embodiments, a material of the golf ball may include from about 5 vol % to about 80 vol % magnetic additive.

In some embodiments, during recycling, golf ball 100 may be pulverized into particles and separated by applying a magnetic field to the particles. Materials with different amounts of magnetic additive may have different levels of attraction toward magnetic fields. For example, materials including 5 vol % magnetic additive may be less attracted to a magnetic field than materials including 10 vol % magnetic additive. Following this principle, a weak magnetic field may be used to separate material particles having the highest amount of magnetic additive from the other material particles. In some embodiments, each layer may have a different amount of magnetic additive. For example, outer cover layer 140 may include about 5 vol % to about 15 vol % magnetic additive. Mantle layer 130 may include about 20 vol % to about 35 vol % magnetic additive. Outer core layer 120 may include about 40 vol % to about 55 vol % magnetic additive. Inner core layer 110 may include 0% magnetic additive. A method 900 of recycling a golf ball having layer(s) including magnetic additive is explained in detail below with reference to FIGS. 8 and 9.

Figure 8:
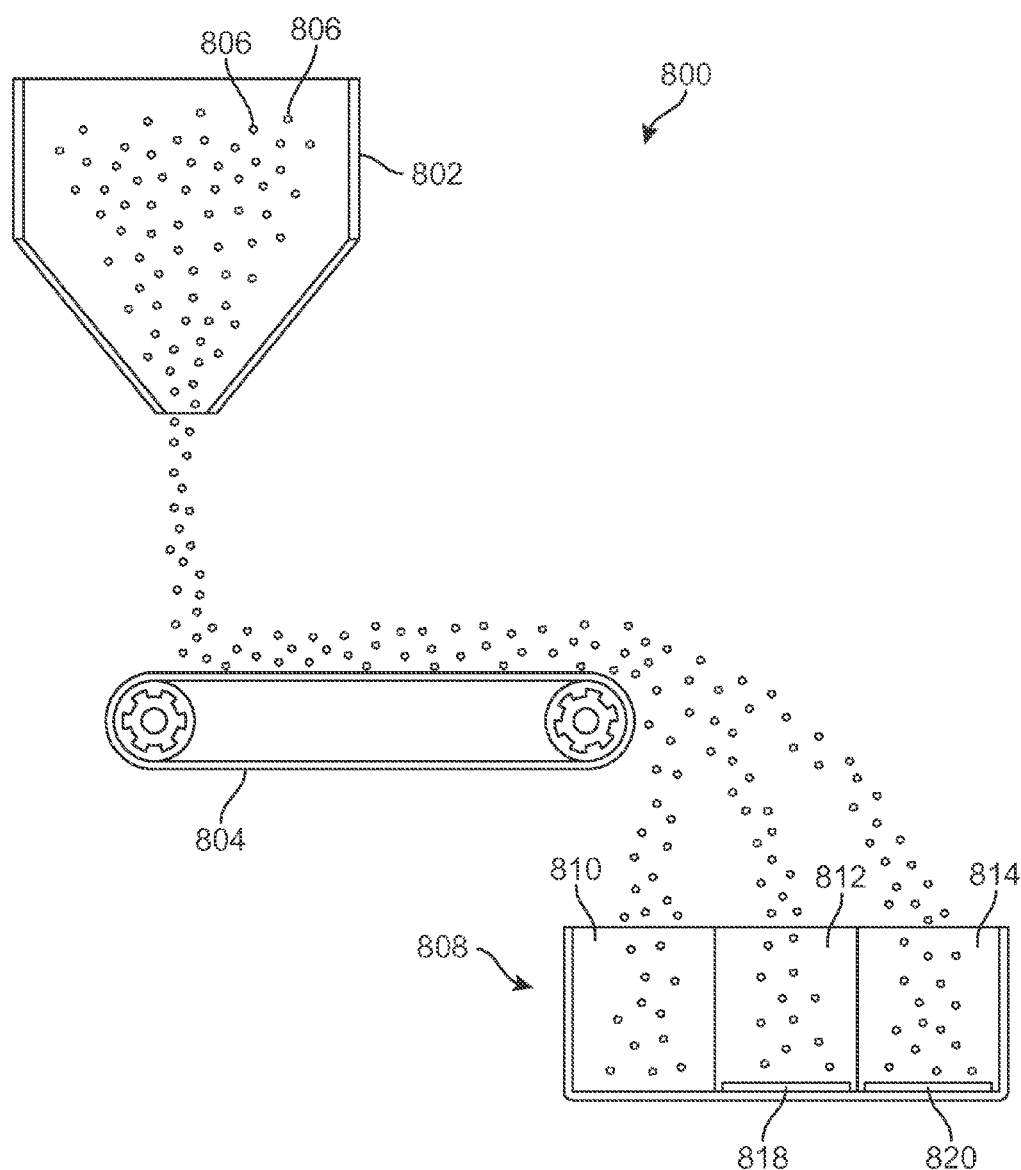
FIG. 8 is equipment that may be used to recycle a golf ball according to an exemplary embodiment.
Figure 9:
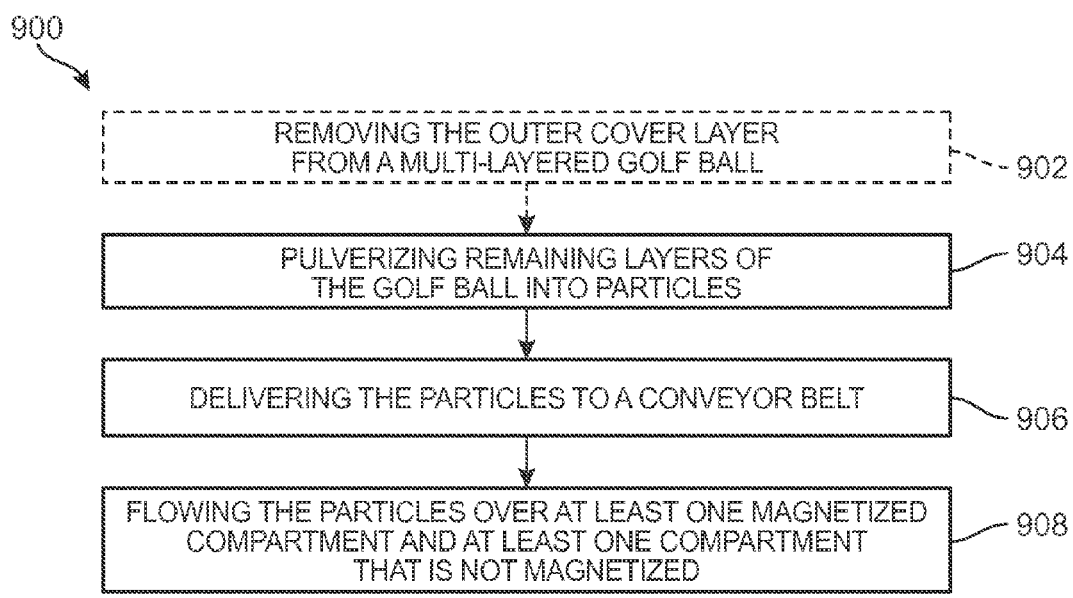
FIG. 9 is a flow chart showing a method of recycling a golf ball according to an exemplary embodiment.

FIG. 8 shows equipment 800 that may be used to perform an exemplary method 900 of recycling a golf ball. Details of method 900 are shown in FIG. 9. Equipment 800 may include a first vessel for collecting, storing, and/or dispensing particles of golf ball material. For example, the first vessel may be a hopper 802. In some embodiments, equipment 800 may include a conveyor 804 for moving and/or dispensing particles of golf ball material. In some embodiments, in place of or in addition to conveyor 804, equipment may include another type of mechanism that can move and/or dispense particles of golf ball material. For example, in some embodiments, in place of or in addition to conveyor 804, equipment 800 may include a tube and twin screws, as shown in FIG. 6. The type of mechanism used to move and/or dispense particles may be selected based on a variety of factors. For example, the type of mechanism used to move and/or dispense particles may be selected based on the types of materials included in the golf ball particles.

In some embodiments, equipment 800 may include a vessel for collecting and/or separating the particles of golf ball material. For example, equipment 800 may include a receptacle 808. In some embodiments, receptacle 808 may include multiple compartments. For example, receptacle 808 may include a first compartment 810, a second compartment 812, and a third compartment 814. The number of compartments may be selected based on a variety of factors. For example, the number of compartments may be selected based on the number of materials of which the golf ball being recycled is made. In some embodiments, one or more of the compartments may be magnetized. In some embodiments, one or more of the compartments may include magnets. For example, as shown in FIG. 8, a magnet 818 may be disposed within second compartment 812 and a magnet 820 may be disposed in third compartment 814. In some embodiments, magnet 818 may have a lower magnetic field than magnet 820. In some embodiments, instead of a single receptacle with multiple compartments, equipment 800 may include multiple receptacles. The compartments may be arranged in any order suitable to cause particles to flow into predetermined compartments during separation.

Method 900 may include an optional step 902 of removing the outer cover layer from a multi-layered golf ball. For example, outer cover layer 140 may be ground off or removed by some other suitable process. In some embodiments, method 900 may include a step 904 of pulverizing remaining layers of the golf ball into particles. Step 904 may be performed in the same manner discussed with reference to step 204 above.

In some embodiments, method 900 may include a step 906 of delivering the particles to a conveyor belt. For example, step 906 may include dispensing particles directly from the machine used to pulverize the golf ball. In some embodiments, particles may be delivered from a vessel they are being stored in to the conveyor belt. For example, the particles may be stored in hopper 802 and then dispensed from hopper 802 onto conveyor belt 804 during step 906. In embodiments in which, in place of or in addition to conveyor 804, equipment 800 includes another type of mechanism that can move and/or dispense particles of golf ball material, step 906 may include delivering particles to the particular mechanism.

In some embodiments, method 900 may include a step 908 of flowing the particles over at least one magnetized compartment and at least one compartment that is not magnetized. Step 908 may separate different types of particles. As discussed above, golf ball 100 may include magnetic additive in one or more layers. The magnetic additive may cause the particles to be attracted to the at least one magnetized compartment. Thus, as the particles are flowed over the compartments, the particles containing magnetic additive may be drawn into the at least one magnetized compartment by magnetic attraction. Gravity may cause the particles not containing magnetic additive may flow into the compartment that is not magnetized. In this manner, particles of different materials may be separated.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

What is claimed is:

1. A method of recycling a golf ball, comprising:
providing a golf ball having a first layer made of a first thermoplastic material, a second layer inward of the first layer and made of a second thermoplastic material different from the first thermoplastic material, and a core inward of the second layer; wherein the first thermoplastic material has a melting point that is at least 10 degrees Celsius lower than the melting point of the second thermoplastic material;
heating the golf ball to a first temperature that is the same or higher than the melting point of the first material and lower than the melting point of the second thermoplastic material to soften, partially melt, or fully melt the first thermoplastic material;
separating the first thermoplastic material from the second layer of the golf ball;
heating the second layer to a second temperature that is the same or higher than the melting point of the second material to soften, partially melt, or fully melt the second thermoplastic material; and
separating the second thermoplastic material from the core.

2. The method according to claim 1, further comprising:
pulverizing the core into particles after separating the second thermoplastic material.

3. The method according to claim 2, further comprising:
delivering the particles of pulverized core into a tube; and twisting a twin screw within the tube to dry the particles and to move the particles out of the tube.

4. The method according to claim 1, wherein the first material is a cover layer of the golf ball.

5. The method according to claim 1, wherein the step of separating the first thermoplastic material includes scraping the first thermoplastic material away from the second layer.

6. The method according to claim 1, wherein the step of separating the second thermoplastic material from the core comprises scraping the second thermoplastic material away from the core.

7. The method according to claim 1, wherein the golf ball comprises a cover outward of the first layer that is removed before heating the golf ball to the first temperature.

* * * * *